(12) United States Patent
Wang et al.

(10) Patent No.: US 7,529,657 B2
(45) Date of Patent: May 5, 2009

(54) CONFIGURABLE PARAMETERS FOR GRAMMAR AUTHORING FOR SPEECH RECOGNITION AND NATURAL LANGUAGE UNDERSTANDING

(75) Inventors: Ye-Yi Wang, Redmond, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 10/950,091

(22) Filed: Sep. 24, 2004

(65) Prior Publication Data

US 2006/0074631 A1   Apr. 6, 2006

(51) Int. Cl.
*B64D 13/02*   (2006.01)
*G06F 17/21*   (2006.01)
*G06F 17/27*   (2006.01)
*G06F 17/28*   (2006.01)
*G10L 15/28*   (2006.01)
*G10L 21/00*   (2006.01)

(52) U.S. Cl. ................... 704/9; 454/74; 704/4; 704/10; 704/255; 704/257; 704/275

(58) Field of Classification Search ............ 704/9, 704/10
See application file for complete search history.

(56) References Cited

U.S. PATENT DOCUMENTS

| 5,040,127 A * | 8/1991 | Gerson ................... 704/255 |
| 6,154,722 A * | 11/2000 | Bellegarda ............... 704/257 |
| 6,230,138 B1 * | 5/2001 | Everhart .................. 704/275 |
| 2003/0120480 A1 * | 6/2003 | Mohri et al. ............... 704/4 |

OTHER PUBLICATIONS

Wang, Ye-Yi (2001): "Robust language understanding in mipad", In EUROSPEECH-2001, 1555-1558.*
S. Seneff, E. Hurley, R. Lau, C. Pao, P. Schmid, and V. Zue, "GALAXY—II : A Reference Architecture for Conversational System Development." In the Proceedings of ICSLP, Sydney, Australia, 1998.
M. A. Walker, A. Rudnicky, R. Prasad, J. Aberdeen, E. O. Bratt, J. Garofolo, H. Hastie, A. Le, B. Pellom, A. Potamianos, R. Passonneau, S. Roukos, G. Sanders, S. Seneff, and D. Stallard, "DARPA Communicator Evaluation: Progress from 2000 to 2001." In the Proceedings of ICSLP, Denver, Colorado, 2002.
A. Waibel, "Interactive Translation of Conversational Speech." *Computer*, vol. 29, 1996.
X. Huang, A. Acero, C. Chelba, L. Deng, D. Duchene, J. Goodman, H.-W. Hon, D. Jacoby, L. Jiang, R. Loynd, M. Mahajan, P. Mau, S. Meredith, S. Mughal, S. Neto, M. Plumpe, K. Wang, and Y.-Y. Wang, "MiPad: A Next Generation PDA Prototype." In the Proceedings of ICSLP, Beijing, China, 2000.
K. Wang, "Semantic synchronous understanding for robust spoken language applications." In the Proceedings of ASRU 2003, St. Thomas, US Virgin Islands, 2003.

(Continued)

*Primary Examiner*—David R Hudspeth
*Assistant Examiner*—Justin W Rider
(74) *Attorney, Agent, or Firm*—Westman, Champlin & Kelly, P.A.

(57) ABSTRACT

A method for authoring a grammar for use in a language processing application is provided. The method includes receiving at least one grammar configuration parameter relating to how to configure a grammar and creating the grammar based on the at least one grammar configuration parameter.

23 Claims, 7 Drawing Sheets

OTHER PUBLICATIONS

M. Johnston, S. Bangalore, G. Vasireddy, A. Stent, P. Ehlen, M. Walker, S. Whittaker, and P. Maloor, "Match: An Architecture for Multimodal Dialogue Systems." In the Proceedings of 40th Annual Meeting of the Association for Computational Linguistics, 2002.

Y.-Y. Wang and A. Acero, "Combination of CFG and N-gram Modeling in Semantic Grammar Learning." In the Proceedings of Eurospeech 2003, Geneva, Switzerland, 2003.

Y.-Y. Wang and A. Acero, "Is Word Error Rate a Good Indicator for Spoken Language Understanding Accuracy." In the Proceedings of Workshop on Automatic Speech Recognition and Understanding, St. Thomas, US Virgin Island, 2003.

G. Riccardi, R. Pieraccini, and E. Bocchieri, "Stochastic Automata for Language Modeling." *Computer Speech and Language*, vol. 10, pp. 265-293, 1996.

Y.-Y. Wang, M. Mahajan, and X. Huang, "A Unified Context-Free Grammar And N-Gram Model For Spoken Language Processing." In the Proceedings of ICASSP, Istanbul, Turkey, 2000.

Ye-Yi Wang et al., "Grammar Learning for Spoken Language Understanding", In Proceedings of ASRU Workshop, Madonna di Campiglio, Italy, 2001.

Ye-Yi Wang et al., "Combination of CFG and N-Gram Modeling in Semantic Grammar Learning", In Eurospeech—2003, 2809-2812.

Ye-Yi Wang et al., "Evaluation of Spoken Language Grammar Learning in the ATIS Domain", IEEE 2002, I-41-I-44.

\* cited by examiner

```
<task name = "ShowFlight">
      <slot type = "City" name = "ACity"/>
      <slot type = "City" name = "DCity"/>
</task>
<task name = "GroundTransport">
      <slot type = "City" name = "City"/>
      <slot type = "Transport_Type" name = "TType"/>
</task>
```

FIG. 3

```
<task>
<ShowFlight text="flight from Seattle to Boston">
      <DCity type = "City">Seattle</DCity>
      <ACity type = "City">Boston</ACity>
</task>
```

FIG. 4

CONFIGURABLE PARAMETERS FOR GRAMMAR AUTHORING FOR SPEECH RECOGNITION AND NATURAL LANGUAGE UNDERSTANDING

BACKGROUND OF THE INVENTION

The present invention relates to speech recognition and natural language understanding. More specifically, the present invention relates to authoring a grammar as a language model for use in performing simultaneous speech recognition and natural language understanding.

Recognizing and understanding spoken human speech is believed to be integral to future computing environments. To date, the tasks of recognizing and understanding spoken speech have been addressed by two different systems. The first is a speech recognition system, and the second is a natural language understanding system.

Conventional speech recognition systems receive a speech signal indicative of a spoken language input. Acoustic features are identified in the speech signal and the speech signal is decoded, using both an acoustic model and a language model, to provide an output indicative of words represented by the input speech signal.

Also, in order to facilitate the development of speech enabled applications and services, semantic-based robust understanding systems are currently under development. Such systems are widely used in conversational, research systems. However, they are not particularly practical for use by conventional developers in implementing a conversational system. To a large extent, such implementations have relied on manual development of domain-specific grammars. This task is time consuming, error prone, and requires a significant amount of expertise in the domain.

In order to advance the development of speech enabled applications and services, an example-based grammar authoring tool has been introduced. The tool is known as SGStudio and is further discussed in Y. Wang and A. Acero, *GRAMMAR LEARNING FOR SPOKEN LANGUAGE UNDERSTANDING*, IEEE Workshop on Automatic Speech Recognition and Understanding, Madonna D. Campiglio Italy, 2001; and Y. Wang and A. Acero *EVALUATION OF SPOKEN LANGUAGE GRAMMAR LEARNING IN ATIS DOMAIN*, Proceedings of ICASSP, Orlando, Fla. 2002. This tool greatly eases grammar development by taking advantage of many different sources of prior information, as well as the machine learning technologies. It allows a regular developer, with little linguistic knowledge, to build a semantic grammar for spoken language understanding. The system facilitates the semi-automatic generation of relatively high quality semantic grammars, with a small amount of annotated training data. Further, the tool not only significantly reduces the effort involved in developing a grammar, but also improves the understanding accuracy across different domains. Still, improvement can be made to easily authoring different types of grammars for different application scenarios.

SUMMARY OF THE INVENTION

A method for authoring a grammar for use in a language processing application is provided. The method includes receiving at least one grammar configuration parameter relating to how to configure a grammar and creating the grammar based on the at least one grammar configuration parameter.

BRIEF DESCRIPTION OF THE DRAWINGS

FIG. 3 illustrates an exemplary schema.

FIG. 4 illustrates exemplary annotated training data.

DETAILED DESCRIPTION OF ILLUSTRATIVE EMBODIMENTS

The present invention deals with a speech recognition and natural language understanding system. More specifically, the present invention deals with grammar authoring used to perform both speech recognition and natural language understanding. However, prior to discussing the present invention in greater detail, one exemplary environment in which the present invention can be used will be discussed.

Figure 1:
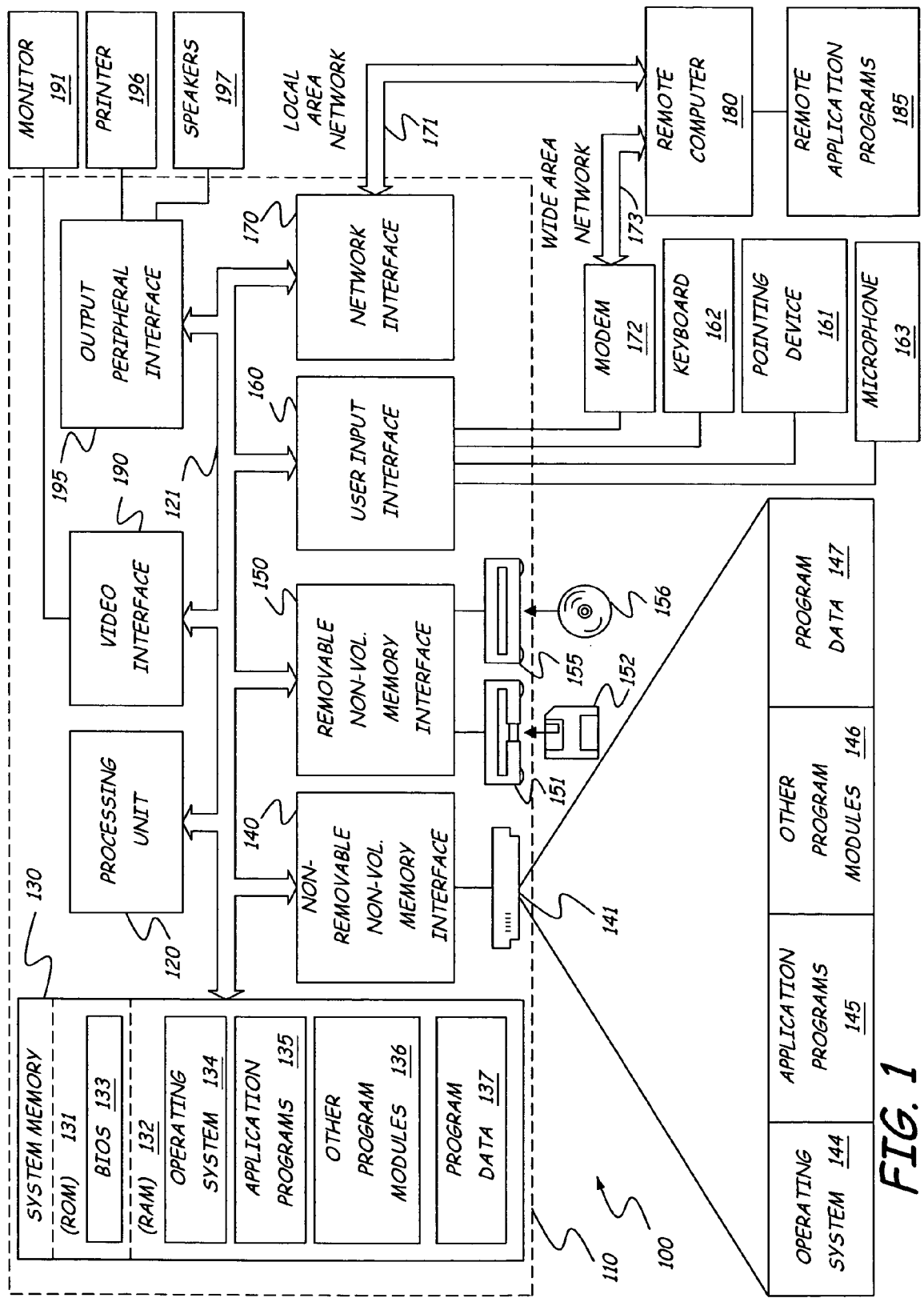
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
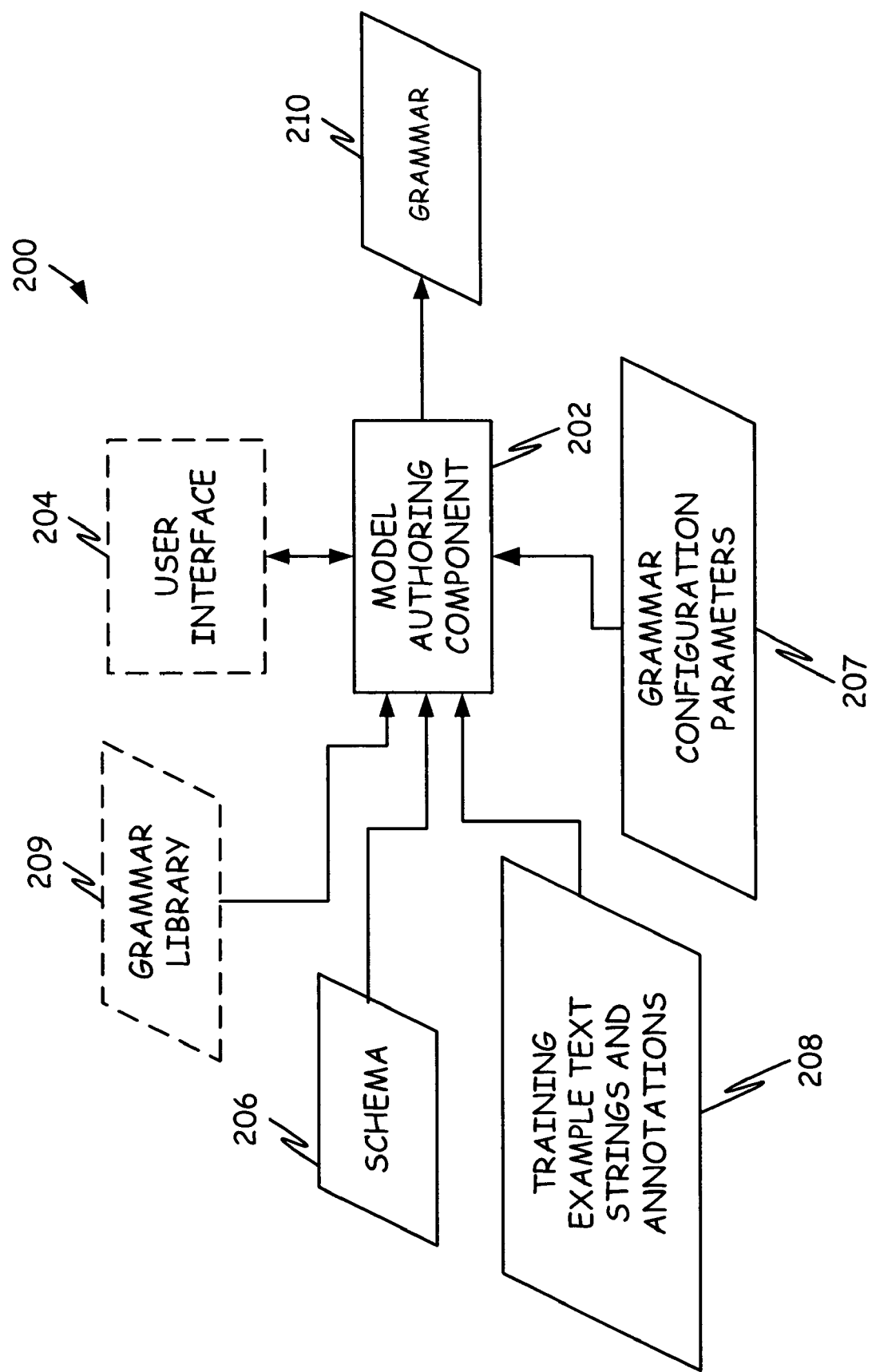
FIG. 2 is a block diagram of an exemplary embodiment of a model-authoring component in accordance with an embodiment of the present invention.

FIG. 2 is a block diagram of a model authoring system 200 in accordance with one exemplary embodiment of the present invention. Model authoring system 200 includes model authoring component 202 and an optional user interface 204. FIG. 2 also shows that model authoring component 202 receives, as an input, a schema 206, grammar configuration parameters 207, a set of annotated training examples 208 (which can generally be referred to as training data), an optional grammar library 209, and outputs a grammar 210 (which can generally be referred to as a model). For example, the grammar 210 can be a context free grammar (CFG), a unified language model or a composite hidden Markov model (HMM/CFG). The optional grammar library 209 includes definitions for domain-independent concepts such as date and time as well as domain dependent concepts such as city names, airlines, etc. that can be obtained from an application database.

It will be appreciated that spoken language understanding can be performed in a system employing grammar 210. When a HMM/CFG model is employed, the grammar 210 can include CFG rules for modeling slots and a statistical model portion (such as an n-gram) for identifying preterminals (such as commands, slot preambles and slot postambles). Thus, during runtime, input sentences are evaluated with the statistical model portion to identify terminals and with the rules-based portion to fill slots.

In system 200, a user provides model authoring component 202 with schema 206, parameters 207 and training example text strings 208. Providing this information can be done either through optional user interface 204, or through some other user input mechanism, or through automated means. Model authoring component 202 receives the inputs and generates a grammar 210 based on the inputs. Schema 206 defines a semantic structure of an application domain and can include several components (which are often referred to as frames) of information. For example, a schema for an airline domain can contain the frame for the task "Show Flight", which in turn contains the slots "arrival city" and "departure city".

FIG. 3 is one illustrative embodiment of an application schema 300. Schema 300 simply states that the application supports two types of information queries: those for flight information (the ShowFlight task) and those for ground transportation information (the GroundTransport task). In order to obtain flight information, a user must provide information about the arrival city (ACity) and/or the departure city (DCity) slots, so the system can search for the information according to the user's specification. The type of a slot specifies the requirement for its "fillers". For both the ACity and DCity slots, the filler must be an expression modeled in the grammar library that refers to an object of the type "City".

The schema determines the general topology of the grammar, which is the default HMM/CFG composite model topology. When using a grammar to model an input sentence in the domain specified by the schema, for example, "display flights from Seattle to New York please" for the "ShowFlight" task in the schema illustrated in FIG. 3, different components are introduced in the grammar to cover different parts in the sentence. Slot fillers cover the words and/or word sequences that specify the contents of the slots (in the example, "Seattle" as the filler for "DCity" and "New York" as the filler for "ACity"). Precommands and postcommands cover words and/or word sequences that occur at the beginning and the end of tasks, in this example, "display flights" and "please", respectively. Likewise, preambles and postambles cover words and/or word sequences that occur before and after slots, respectively. In the example, the preamble for the "DCity" slot covers the word "from" and the preamble for "ACity" slot covers the word "to". The postambles for both slots in the example cover nothing (empty strings). During the training process, the machine learning algorithm only requires the slot fillers be marked in the training sentences, while it figures out automatically which components (specifically, precommand, postcommand, preamble or postamble) cover the rest of the words, and build statistical models for these components.

In accordance with the present invention, grammar 210 is developed based on parameters 207 that are provided as a user's specifications depending on a particular application for grammar 210. The configuration parameters 207 customize the general grammar topology determined by the schema to best suit different application scenarios. Grammar 210 can model precommands, postcommands, preambles and postambles differently based on the parameters. In one embodiment, topologies are special cases of a HMM/CFG composite model.

Using different grammar topologies for different applications provides a tradeoff between robustness and maintainability, as well as a tradeoff between accuracy of the model and the requirement of labeled training data to develop the model. Configuring grammars for particular applications can be performed by altering parameters 207 with the robustness/maintainability and accuracy/data-requirement tradeoffs in mind. In particular, use of an N-gram to model particular aspects of the output grammar 210 can provide a more robust grammar.

The N-gram is capable of modeling language not appearing in training data. For example, if the training example contains "show me the flights from X to Y" for the Show-Flight semantic frame, a smoothed n-gram model can also accept the utterances "flights from A to B" or "please display the flights departing from A to B". However, the robustness of the N-gram is achieved with a sacrifice of readability of the grammar. A CFG can be easy to understand and update, but when a CFG is converted from an n-gram, it is normally hard to read. As a result, it is very hard to manually maintain (i.e. update) the grammar.

In one embodiment, the system 200 directly uses a word sequence from the training data 208 to form CFG rules in grammar 210 instead of using the word sequence to train an n-gram model for a preterminal. In such a case, the model 210 is more readable, thus more easily maintainable by a grammar developer that can read the grammar and add/delete/modify the rules. The CFG rules require an exact match of the word sequence in an input sentence when used in an application. Otherwise, no correct semantic structure can be constructed for an input sentence according to the grammar. Thus, the model without using an N-gram is less robust, but easier to read and maintain.

Normally, a composite model needs annotated training data, as illustrated in FIG. 4, to train slot transition parameters in the overall grammar topology as well as n-gram parameters for each individual command, preamble and postamble. Training data 301 includes an exemplary annotated sentence having tags denoting a departure city "Seattle" and an arrival city "Boston". In one embodiment, the n-grams in the composite model for commands, preambles and postambles can be replaced with a wildcard that matches any phonetic sequence by altering parameters 207. In such a case, there is no need for training data. However, since the wildcard has to model everything, the distribution of the model is flat. Hence, when the model is used as the LM for speech recognition, the parts of users' utterances that should be covered by the wildcard tend to have lower scores, and the recognizer can make more false-positive errors that mistake something unimportant in an utterance as the slot fillers due to the flat model distribution.

Different grammar topologies are illustrated and discussed below with respect to FIGS. 5-12. Using grammar parameters 207, grammar 210 can be configured to best suit different application scenarios discussed with respect to FIGS. 5-12. Additionally, grammar developers can make decisions regarding the robustness/maintainability and accuracy/training data tradeoffs, wherein an N-gram can provide robustness and a CFG can provide easier readability and future grammar modification.

Figure 5:
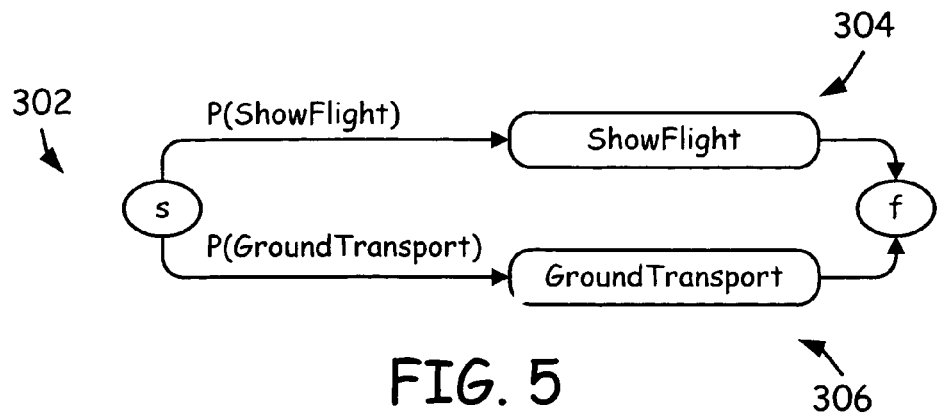
FIGS. 5-7 illustrate a grammar topology for a first application scenario.
Figure 6:
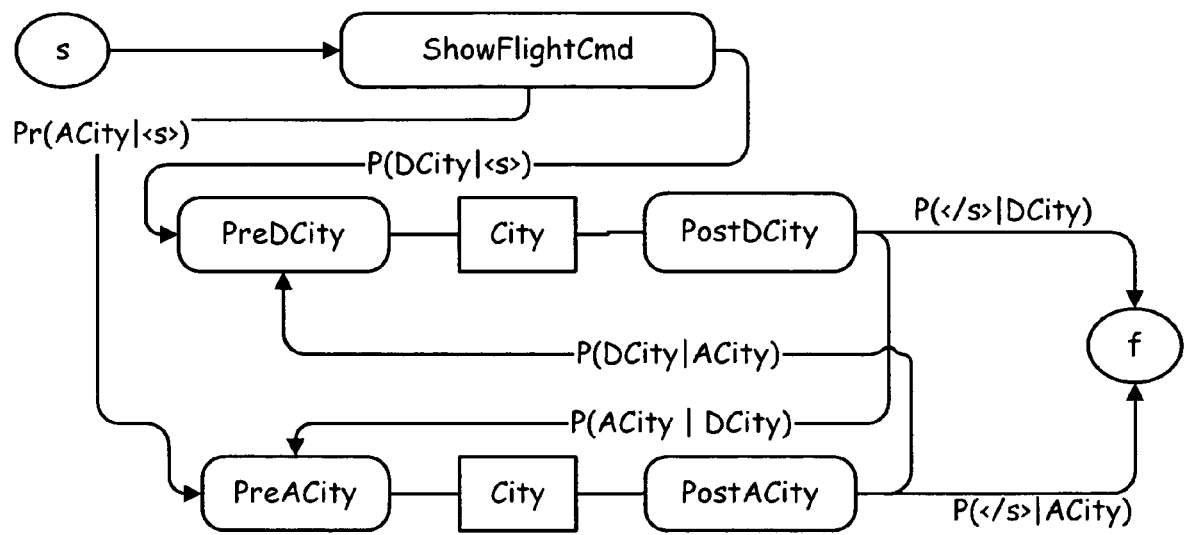
Figure 7:
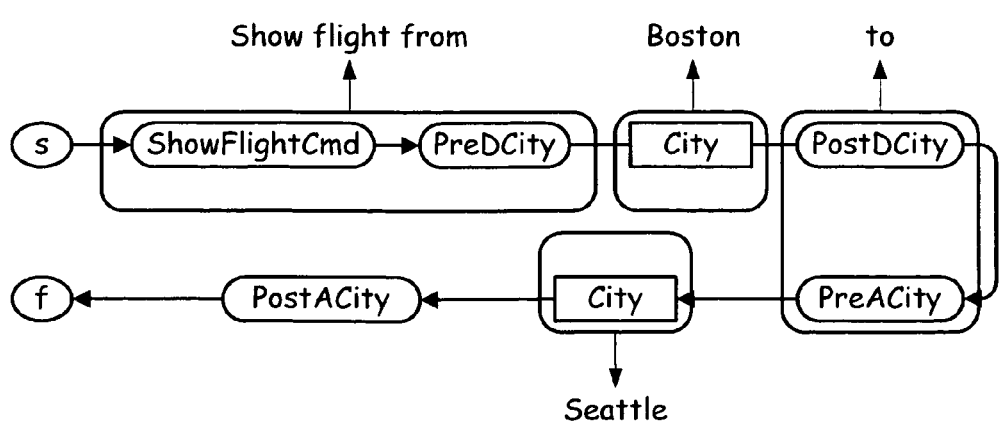

FIGS. 5-7 illustrate a topology used for a mixed initiative dialog application with slot disambiguation based on the schema illustrated in FIG. 4. A mixed initiative situation arises when a sentence may include more information (i.e. slots to be filled) than what a computer asked for. Slot disambiguation refers to a situation where information offered by a user can be filled in different slots in a schema. The topology described with respect to FIGS. 5-7 is very robust and has a high degree of accuracy. However, reduced performance and readability of the resultant grammar can result.

In FIGS. 5-7, a suitable grammar uses a statistical portion (implemented, for example, using Hidden Markov model technology) to encode the structural information of an application schema. It uses a rules-based portion (implemented using, for example, CFG technology) to model the emissions of the HMM states that correspond to the slot fillers, and it uses the n-grams to model the command and the preambles/postambles surrounding a slot filler that serve as the clue for the identity of the filler. The semantic-bearing overall topology of the grammar can be represented in a finite state representation, in a compact manner, even though it accounts for unseen words.

FIGS. 5 and 6 show a statistical model portion (an HMM) that incorporates the semantic constraints of schema 300 into a natural language understanding rules-based finite state grammar, which in turn can be represented with a CFG in a format like the industry standard W3C Speech Recognition Grammar Specification (SRGS). FIG. 5 illustrates a top-level structure 302 that has two branches, one leading to ShowFlight subnetwork 304 and the other leading to GroundTransport network 306. The transition weights on each of the branches are the probabilities for the two tasks. Therefore, the transition weight from the S-node to the ShowFlight subnetwork 304 corresponds to the probability of a ShowFlight task (or command), while the transition probability to the GroundTransport subnetwork 306 corresponds to the probability of a GroundTransport task.

FIG. 6 illustrates the ShowFlight subnetwork 304 model in greater detail, and use of the subnetwork model is illustrated by FIG. 7. The ShowFlight subnetwork model 304 shown in FIG. 6 models the linguistic expressions that users may use to issue a ShowFlight command. The subnetwork model starts with a command portion (such as "Show me the flight"), followed by the expressions for slots. Each slot is bracketed by a preamble and postamble, which serve as the linguistic context for the slot. For example, the word "from" is a preamble for the DCity slot. It signals that the City following it is likely a departure city. The slots are inter-connected, and the connections are weighted with the bigram probability for slot transitions, which is estimated from training data.

In the subnetwork model 304, the command, preambles and post-ambles are modeled with statistical n-gram models. These are illustrated by the oval portions in subnetwork model 304. The slot fillers are modeled with probabilistic CFG rules from a grammar library. These are illustrated by the rectangles shown in subnetwork model 304. The probabilities for the rules in the grammar library are illustratively tuned using domain specific data and are smoothed. The n-grams in the model 304 can be trained with partially labeled training data like the one in FIG. 4.

It is possible to use the grammar in a speech recognition system. The grammar is first converted into a format that a speech recognition decoder can accept as its language model. Therefore, the statistical n-gram models used to model the command, preambles and post-ambles (i.e., those n-grams inside the CFG) are converted into probabilistic finite state automata, which can be represented in SRGS. The converted n-grams and the top level HMM structure (such as 302 shown in FIG. 5), together with the rules in the library grammar, form a probabilistic context-free grammar (PCFG) language model.

Given the HMM/CFG composite model in FIGS. 5-7, other grammar topologies can be viewed as special cases of the HMM/CFG composite model. Using various grammar configuration parameters 207, authoring component 202 can be configured to output special-case grammars according to a user's specification. In one embodiment, six configuration parameters are used, such that the grammar can best suit the different application scenarios discussed above. Grammar developers can also make a decision if an n-gram should be used to model the preambles for improved robustness, or a CFG rule should be used for improved readability that ensures the possibility of later manual modification of the grammar.

While configuration parameters 207 control the output grammar topology, it does not significantly change the internal grammar learning algorithm. Table 1 lists six exemplary parameters and possible values that control the topology of the grammar produced by authoring component 202, together with an explanation of each parameter's impact on the outcome grammar.

TABLE 1

Configuration parameters for the grammar topology produced by authoring component 202.

| Parameter | Value | Grammar Configuration |
|---|---|---|
| Backbone | Template_HMM | Using the HMM backbone with different preamble and postambles |
| | Domain_Ngram | Use a single n-gram that models word and superword (CFG non-terminals) as the backbone of the model |
| Preamble | None | No preambles for slots |
| | Wildcard | Use wildcard to model the preambles |
| | PoolNgram | Share the n-gram model for all preambles |
| | Ngram | Use specific n-gram model for preambles |
| | Rule | Use specific CFG rules for preambles |
| Postamble | None | No preambles for slots |
| | Wildcard | Use wildcard to model the postambles |
| | PoolNgram | Share the n-gram model for all postambles |
| | Ngram | Use specific n-gram model for postambles |

TABLE 1-continued

Configuration parameters for the grammar topology produced by authoring component 202.

| Parameter | Value | Grammar Configuration |
|---|---|---|
| | Rule | Use specific CFG rules for postambles |
| Precommand | None | No preambles for slots |
| | Wildcard | Use wildcard to model the precommands |
| | PoolNgram | Share the n-gram model for all precommands |
| | Ngram | Use specific n-gram model for precommands |
| | Rule | Use specific CFG rules for precommands |
| Postcommand | None | No preambles for slots |
| | Wildcard | Use wildcard to model the preambles |
| | PoolNgram | Share the n-gram model for all postcommands |
| | Ngram | Use specific n-gram model for postcommands |
| | Rule | Use specific CFG rules for postcommands |
| SlotModel | 1 | Use unigram for the slot probability Pr(slot) in the model topology |
| | 2 | Use bigram Pr(slot2\|slot1) for slot transition (first order Markov chain) |

Figure 8:
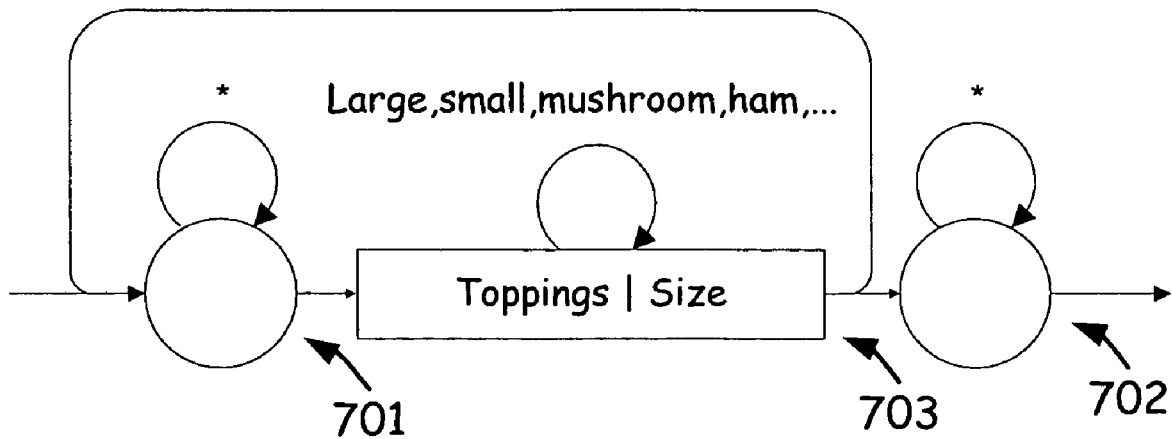
FIG. 8 illustrates a grammar topology for a second application scenario.

FIG. 8 illustrates a simpler topology of a special case of the HMM/CFG composite model that can be used in a keyword spotting scenario for a directed dialog. In this situation, a system may prompt a user for a single answer and the user's answer can be one of the keywords. For example, in a pizza ordering application, the system may prompt the user for a size and toppings of a pizza. The user may reply "I want to have a large pizza with ham" or "medium with mushroom please". The grammar needs to spot the size and toppings from the user's utterance. In FIG. 8, the symbol "*" is used as a wild card to model any input before and after the slots. The topology in FIG. 8 does not require training data and provides an easily understandable grammar. However, the grammar can be prone to errors and is not suitable for other applications.

An XML schema can be used to denote the selections for parameters 207. For the wildcard model in FIG. 8, preambles and postcommands are replaced with the same wildcard so they collapse into the two states 701 and 702, and the CFG filler states collapse into the single state 703 that accepts the union of the language defined by each CFG. The first wildcard 701 (the collapsed state of all preamble) models the language expressions that appear at the beginning of utterance and in-between two slots, and the second wildcard 702 captures the expression at the end of a users' utterances after the last slot. Table 2 below lists the XML schema for the wildcard model.

TABLE 2

The XML schema configuration that creates the wildcard model.

<GrammarConfiguration>
  <Preamble>Wildcard</Preamble>
  <Postamble>None</Postamble>
  <PreCommand>None</PreCommand>
  <PostCommand>Wildcard</PostCommand>
  <SlotModel>1</SlotModel>
</GrammarConfiguration>

When users may volunteer more information (slots) in one utterance rather than just answer what the system has asked for, as in the case of a mixed initiative dialog, and there are few ambiguities in slot fillers, a unified language model can be a good modeling candidate. The unified language model uses a CFG to model slot fillers and uses a common n-gram to model all other words that connect multiple slots together.

The CFG rules are more restrictive to avoid semantic errors, while the n-gram is more lenient and therefore more robust. Because the unified language, model uses a single n-gram, it thus requires less training data than the HMM/CFG composite model that uses multiple n-grams for different commands and slot preambles/postambles. On the other hand, the lack of the task-specific command model and the slot-specific preamble/postamble models makes it not suitable for semantic disambiguation, which is a process that picks one semantic interpretation for a phrase from multiple candidates, for example, "two" as a number or a time expression, and "Boston" as a Departure_City or an Arrival_City.

Figure 9:
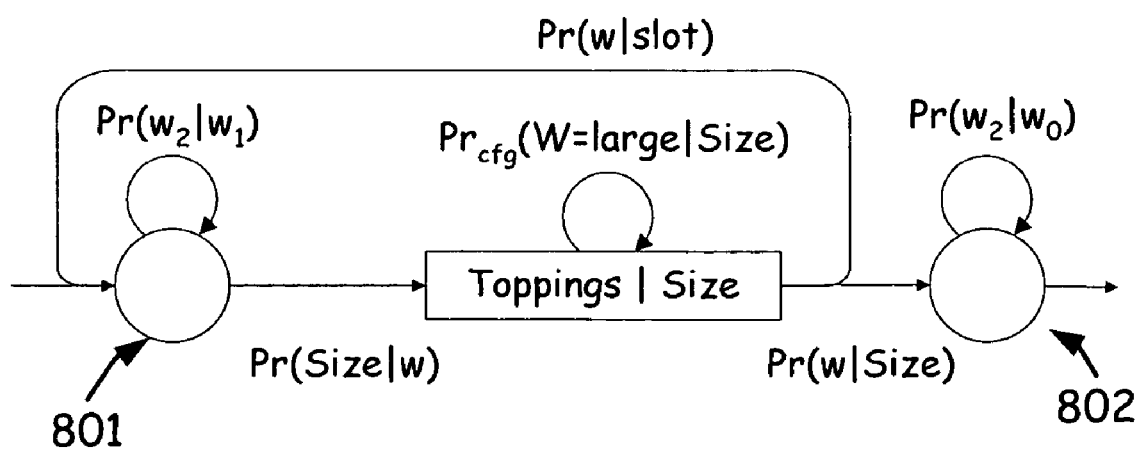
FIG. 9 illustrates a grammar topology for a third application scenario.

FIG. 9 illustrates an exemplary unified language model topology. Using a unified language model, the CFG non-terminals, for example, <Toppings> and <Size> (represented as a rectangle in FIG. 9), are introduced into the n-gram model as a super-word. From the super-word, the terminal lexical item will be generated according to the distributions defined in the PCFG (Probabilistic CFG). Therefore, the probability of a sample sentence can be calculated by multiplying the n-gram and PCFG probabilities along a path that generates the sentence with the model.

Figure 10:
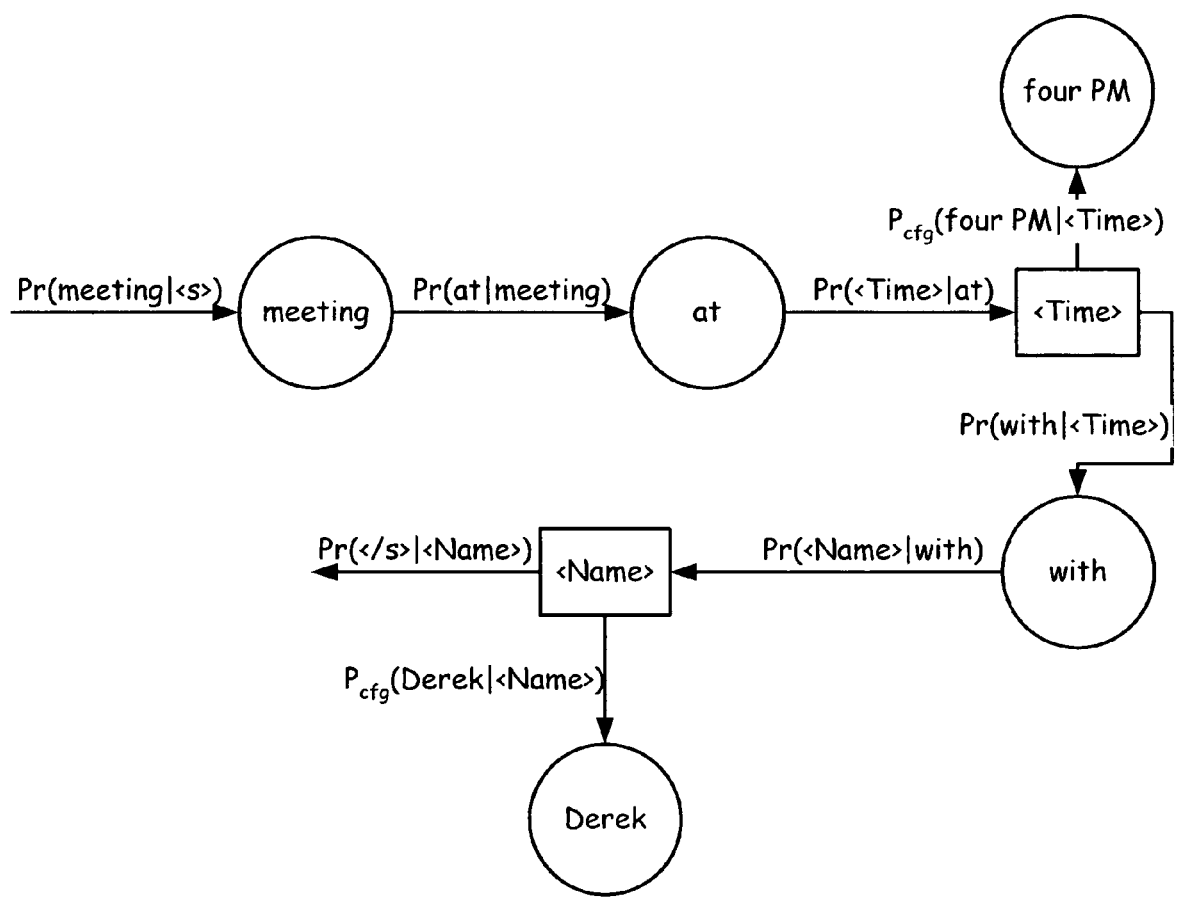
FIG. 10 illustrates a search path of an exemplary sentence in the unified language model topology for the third application scenario.
Figure 11:
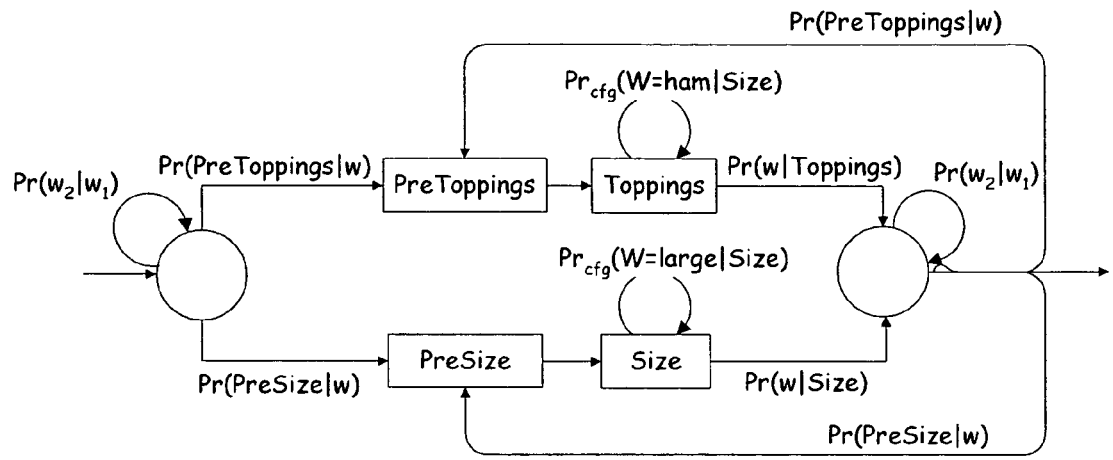
FIG. 11 illustrates a grammar topology for a fourth application scenario.
Figure 12:
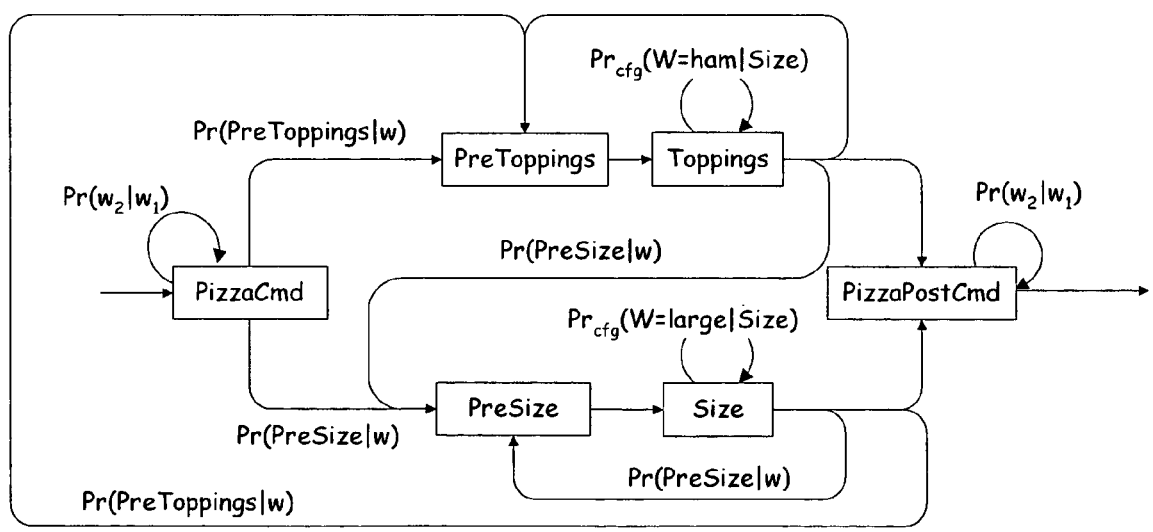
FIG. 12 illustrates a grammar topology for a fifth application scenario.

For example, an implementation of a unified language model is illustrated in FIG. 10, which shows the path for the sentence across the model:

meeting at four PM with Derek.

With a traditional n-gram model, the probability of the sentence is:

Pr(" meeting at four PM with Derek")=Pr(meeting |<s>)× Pr(at|meeting)×Pr(four|at)×Pr(PM|four) Pr(with|PM)× Pr(Derek|with)×Pr(</s>|Derek)

When introducing CFG non-terminals <Name> and <Time> (represented as rectangles in FIG. 10), a probability can be calculated using the n-gram and PCFG probabilities. In FIG. 10, the probabilities are multiplied along the path that generates the probability:

Pr(" meeting at four PM with Derek")=Pr(meeting|<s>)× Pr(at|meeting)×Pr(<Time>|at)×Pr$_{c/g}$(four PM |<Time>) Pr(with|<Time>)×Pr(<Name>|with)×Pr$_{c/g}$ (Derek|<Name>)×Pr(</s>|<Name>)

Tables 3 and 4 are useful for mixed initiative situations with few slot ambiguities. Table 3 configures the grammar as an n-gram unified language model, as illustrated in FIG. 9, while Table 4 configures the grammar as the unified model with CFG preambles for slot disambiguation, illustrated in FIG. 11. Here the precommands and postambles are modeled with a single n-gram (Poolngram). The NGRAM backbone configures the n-gram to predict the CFG nonterminals (slot fillers) from the preceding words in the n-gram, as well as using the CFG nonterminals as the context to predict the words following them. Since all precommands and postambles are modeled with a single n-gram, they collapse into two states 801 and 802 in FIG. 9 that bracket the slot. The resulting model topology is similar to the one in the wildcard model. The difference is that the n-gram is used to model the non-slot words and the contextual dependency among words/slots in the unified language model.

TABLE 3

The configuration that create the n-gram unified language model.

```
<GrammarConfiguration>
    <Backbone>Domain_Ngram</Backbone>
    <Preamble>None</Preamble>
    <Postamble>PoolNGram</Postamble>
    <PreCommand>PoolNGram</PreCommand>
    <PostCommand>None</PostCommand>
    <SlotModel>2</SlotModel>
</GrammarConfiguration>
```

TABLE 4

The configuration that creates the rule based unified language model.

```
<GrammarConfiguration>
    <Backbone>Domain_Ngram</Backbone>
    <Preamble>Rule</Preamble>
    <Postamble>PoolNGram</Postamble>
    <PreCommand>PoolNGram</PreCommand>
    <PostCommand>None</PostCommand>
    <SlotModel>2</SlotModel>
</GrammarConfiguration>
```

The difference between a unified language model configuration and a HMM/CFG composite model configuration relates to the backbone parameter of Table 1 and the way that preambles, precommands, postambles and postcommands are modeled. The unified language model uses the Domain_Ngram backbone, and all the preambles, precommands, postambles and postcommands share the same language model. On the other hand, the composite model uses the Template_HMM paramater as used in FIGS. 5-7 and each preamble, postamble, precommand and postamble are modeled with its own n-gram, so they can serve as clues for the slot identity.

Tables 5 and 6 are configured with a HMM backbone. Unlike the NGRAM backbone that used a word/nonterminals mixed n-gram model, the words in the HMM backbone model are generated from a state (nonterminal) independent of other states or words in other states. The nonterminals are modeled with a non-terminal only n-grams. Table 5 is the most commonly used simplified HMM/CFG composite model that drops the postambles and uses the preamble and the slot transitional bigram probability in semantic disambiguation. Table 6 replaces all the n-gram models with CFG rules, and results in the grammar topology illustrated in FIG. 12 for better readability/maintainability. In such a configuration, the same preterminal-specific n-grams are trained with the EM algorithm that treats the word/state alignments as the hidden variable, in exactly the same way as the model configured by Table 5. When the grammar is learned, an extra step of Viterbi alignment can be performed with the trained model to find the best word sequence associated with each precommand, preamble and postcommand. The word sequences are then stored as a CFG rule for precommand, preamble and postcommand respectively.

TABLE 5

The configuration that creates the n-gram based HMM/CFG composite SLU model.

```
<GrammarConfiguration>
    <Backbone>template_HMM</Backbone>
    <Preamble>NGram</Preamble>
    <Postamble>None</Postamble>
```

TABLE 5-continued

The configuration that creates the n-gram based HMM/CFG composite SLU model.

```
    <PreCommand>NGram</PreCommand>
    <PostCommand>NGram</PostCommand>
    <SlotModel>2</SlotModel>
</GrammarConfiguration>
```

TABLE 6

The configuration that creates the rule based HMM/CFG composite SLU model.

```
<GrammarConfiguration>
    <Backbone>Template_HMM</Backbone>
    <Preamble>Rule</Preamble>
    <Postamble>None</Postamble>
    <PreCommand>Rule</PreCommand>
    <PostCommand>Rule</PostCommand>
    <SlotModel>2</SlotModel>
</GrammarConfiguration>
```

Using the configurable parameters described above, grammars can be authored due to a user's specifications. The parameters provide an effective tool for authoring grammars in different situations.

Although the present invention has been described with reference to particular embodiments, workers skilled in the art will recognize that changes may be made in form and detail without departing from the spirit and scope of the invention.

What is claimed is:

1. A method for authoring a grammar for use in a language processing application, comprising:
   i. receiving a semantic structure including a plurality of parts that represent a task;
   ii. receiving a plurality of grammar configuration parameters separate from the semantic structure, the plurality of grammar configuration parameters providing information related to grammar components associated with parts of the semantic structure in order to configure a grammar for the semantic structure, the parameters comprising a first value for a grammar component having a first type of grammar topology and a second value for a grammar component having a second type of grammar topology, wherein the second type of grammar topology is different than the first type of grammar topology; and
   iii. creating the grammar, via a processor, based on the plurality of grammar configuration parameters, wherein the grammar utilizes grammar components of selected topologies based on the plurality of grammar configuration parameters to analyze a natural language input.

2. The method of claim 1 wherein creating comprises: receiving a selected grammar configuration parameter and, in response, configuring a backbone of the grammar based on the selected grammar configuration parameter.

3. The method of claim 1, wherein the semantic structure comprises a schema defining slots and preterminals associated with the task, wherein creating the grammar comprises: creating the grammar based on the plurality of grammar configuration parameters such that a first grammar component having the first type of grammar topology models one or more of the slots associated with the task based on the first value and a second grammar component having the second type of grammar topology models one or more of the preterminals associated with the task based on the second value.

4. The method of claim 3 wherein the preterminals comprise preambles and postambles for the slots, and wherein creating the grammar comprises:

creating the grammar such that the second grammar component models the preambles and the postambles for the slots.

5. The method of claim 3 wherein the grammar models a precommand for one of the tasks based on one of the grammar configuration parameters.

6. The method of claim 3 wherein the grammar models a postcommand for one of the tasks based on one of the grammar configuration parameters.

7. The method of claim 3 wherein the grammar models a transition between slots based on one of the grammar configuration parameters.

8. The method of claim 1 wherein the semantic structure comprises a schema defining slots and preterminals associated with the task, wherein the preterminals comprise preambles and postambles for the slots, and wherein creating the grammar comprises:

creating the grammar such that the first grammar component having the first type of grammar topology models the preambles for the slots and the second grammar component having the second type of grammar topology models the postambles for the slots.

9. The method of claim 1 wherein the grammar includes a wildcard that models any phonetic sequence.

10. The method of claim 1 wherein the grammar components comprise at least two of a rules-based context-free grammar, a statistical model, an n-gram model, and a hidden markov model (HMM).

11. The method of claim 10 wherein the grammar configuration parameters map selected grammar components to the parts of the semantic structure.

12. The method of claim 1 wherein the grammar includes a unified language model.

13. The method of claim 1 wherein the grammar is an HMM/CFG composite model.

14. A grammar authoring system, comprising:

a schema defining a structure for a task, the schema including slots and preterminals that are to be filled with terms from a natural language input, wherein the preterminals comprise preambles and postambles that provide a linguistic context for the slots;

a set of grammar configuration parameters, separate from the schema, providing information related to grammar components for modeling the slots and preterminals of the schema, wherein the parameters comprise a first value for a grammar component having a first type of grammar topology for modeling the slots and a second value for a grammar component having a second type of grammar topology for modeling the preterminals, wherein the second type of grammar topology is different than the first type of grammar topology; and a model authoring component receiving the schema and the set of grammar configuration parameters and configuring a grammar based on the schema and the set of grammar configuration parameters to map terms from a natural language to the slots and preterminals in the schema, wherein the model authoring component configures the grammar to utilize a first grammar component having the first type of grammar topology to map terms from the natural language input to the slots of the schema and to utilize a second grammar component having the second type of grammar topology to map terms from the natural language input to the preterminals of the schema.

15. The system of claim 14, wherein the grammar authoring component receives a selected grammar configuration parameter and, in response, configures a backbone of the grammar based on the selected grammar configuration parameter.

16. The system of claim 14, wherein the grammar components comprise at least a rules-based grammar and a statistical model.

17. The system of claim 16, wherein the grammar components further comprise a wildcard model that models any phonetic sequence.

18. The system of claim 17, wherein the preterminals include precommands and postcommands associated with the task, and wherein the grammar authoring component configures one of the rules-based grammar, statistical model, and wildcard model based on the set of grammar configuration parameters to model the precommands and postcommands for mapping portions of the natural language input to the precommands and postcommands.

19. The system of claim 17, wherein the preterminals include preambles and postambles associated with the slots, and wherein the grammar authoring component configures one of the rules-based grammar, statistical model, and wildcard model based on the set of grammar configuration parameters to model the preambles and postambles for mapping portions of the natural language input to the preambles and postambles.

20. The system of claim 18, wherein the grammar authoring component receives at least one grammar configuration parameter relating to transitions between the slots and, in response, configures a slot transition model for modeling transitions between the slots.

21. The system of claim 16, wherein the grammar authoring component configures the grammar based on the set of grammar configuration parameters to include a unified language model such that each of the preterminals is modeled using the statistical model.

22. The system of claim 16, wherein the grammar authoring component configures the grammar based on the set of grammar configuration parameters to include an HMM/CFG composite model.

23. The system of claim 22, wherein the grammar authoring component configures the grammar based on the set of grammar configuration parameters to include a plurality of statistical models such that each preterminal is modeled with a respective statistical model of the plurality of statistical models.

* * * * *